United States Patent Office 3,294,039
Patented Dec. 27, 1966

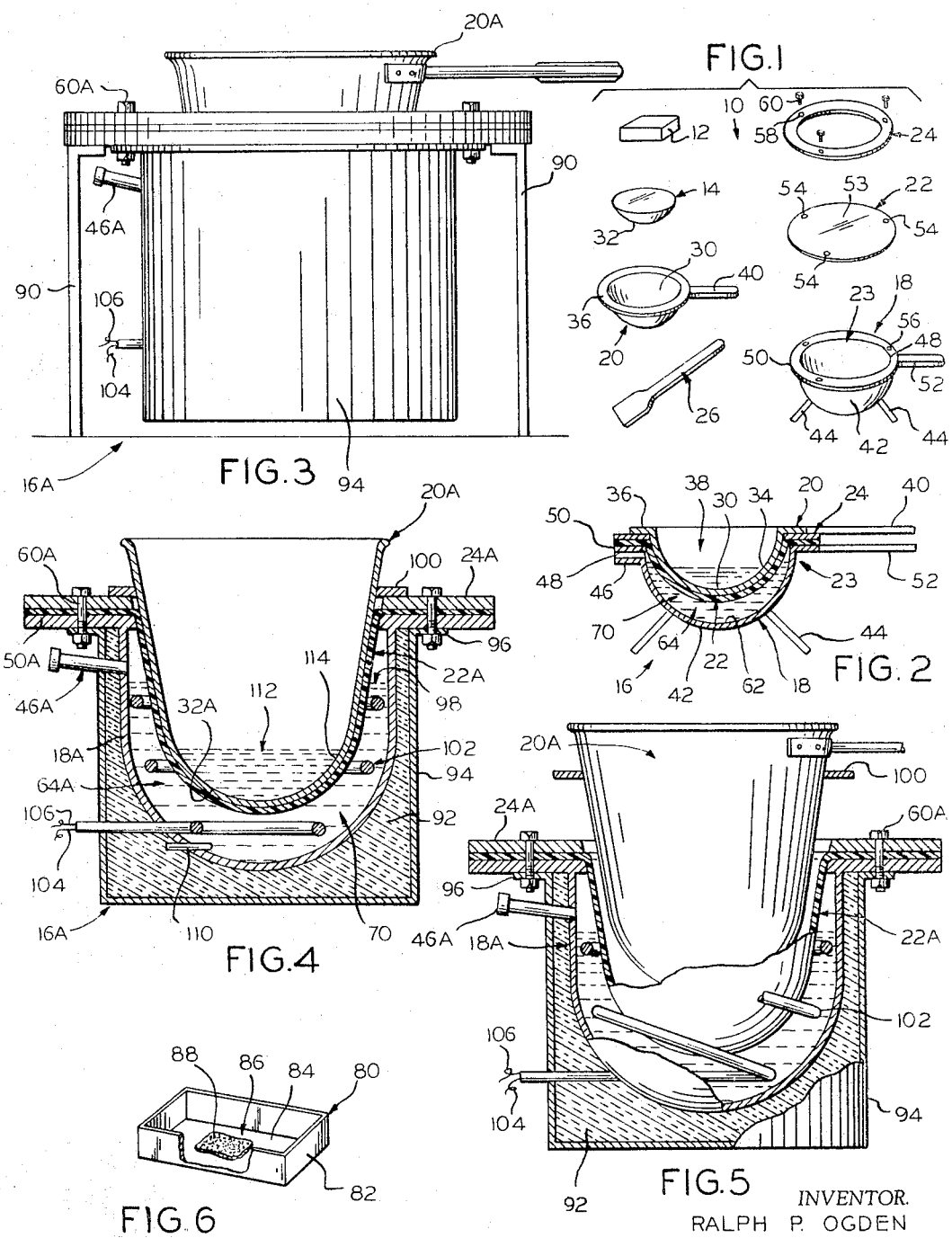

3,294,039
METHOD AND APPARATUS FOR MAKING CARAMEL CORN
Ralph P. Ogden, 7522 Walnut St., Hammond, Ind. 46322
Filed Aug. 20, 1963, Ser. No. 303,228
8 Claims. (Cl. 107—54)

My invention relates to the making of caramel corn, and more particularly, to apparatus, methods, and prepackaged kits for making caramel corn.

Caramel corn consists essentially of popped corn that is coated with a suitable caramel composition, which may take the form of a mixture of can sugar (or sucrose), corn sugar (or dextrose), water, and some fatty substance, such as butter or vegetable oil.

Caramel corn is customarily made by heating the caramel to liquid form and mixing into it a quantity of popped corn to coat the latter. However, since caramel is quite sensitive to overheating, and since it is rather viscous in its liquid form, difficulties have been encountered in this art in readily providing uniformly coated popped corn in which the caramel coating is free from adverse taste affects, caused by localized overheating.

A principal object of my invention is to provide devices and methods of making top quality caramel corn on either a commercial or a home "do-it-yourself" basis with equal facility.

Another important object of the invention is to provide a method and device for heating caramel and stirring popped corn into it that insures uniform heating of the caramel and uniform stirring of the corn through the caramel.

Still another important object of the invention is to provide a device or apparatus that is especially adapted for heating caramel from its solid state to the temperature in its liquid form that is appropriate for coating popped corn.

Yet other objects of the invention are to provide a kit for making caramel corn on a family do-it-yourself basis, to provide a caramel lump or glob of special shape for use in facilitating the readying of caramel for coating purposes, and to provide caramel corn making devices that are economical of manufacture, convenient in use, and readily adapted for use either on a commercial or individual family basis.

Other objects, uses, and advantages will be obvious or become apparent from a consideration of the following detailed description and the application drawings.

In the drawings:

FIGURE 1 is a diagrammatic exploded perspective view illustrating the principal components of a caramel corn making kit for family do-it-yourself use that is arranged in accordance with my invention;

FIGURE 2 is a transverse cross-sectional view through the heating device of the kit of FIGURE 1 as assembled for making caramel corn;

FIGURE 3 is a side elevational view of a caramel heating device or apparatus adapted for a commercial caramel corn making installation;

FIGURE 4 is a transverse cross-sectional view of the apparatus of FIGURE 3, diagrammatically showing the principal components thereof;

FIGURE 5 is similar to FIGURE 4, but showing the heating kettle displaced from the flexible diaphragm for purposes of better bringing out the differences between some adjacent structures; and FIGURE 6 illustrates diagrammatically a suitable caramel temperature indicating device that I prefer to employ in connection with this invention.

However, it should be understood that the specific drawing illustrations provided are supplied to comply with the requirements of 35 U.S.C. 112, and that the invention may take other specific embodiments. Consequently, the appended claims are to be construed as broadly as the relevant prior art will permit.

Turning first to the embodiment of FIGURES 1 and 2, the caramel corn making kit 10 includes a suitable container 12 of corn kernels from which popcorn can be made in the usual manner, a quantity of caramel material in the special lump from that is indicated at 14, the caramel heating device 16 (see FIGURE 2), which comprises a heater pot 18, a kettle 20, a distendable thermally conductive diaphragm 22 that is to be secured across the top 23 of pot 18, and a clamping ring 24 for securing the diaphragm 22 to the pot 18, as by employing suitable bolts.

The kit 10 may also include a stirring paddle 26 of any appropriate type for use in stirring the popcorn into the melted caramel.

The caramel heating device 16 and the caramel lump 14 have a very special significance in accordance with my invention.

In accordance with this invention, the kettle 20 is of the round bottom type and is provided with a rounded bottom portion 30 that may be generally spherically contoured in configuration, and further in accordance with my invention, the caramel lump 14 is formed with a complementary bottom portion 32 that substantially complements the concave configuration of the inside surface 34 of kettle 20.

The caramel lump 14 is a premixed caramel substance of any appropriate caramel composition. One appropriate recipe would be (for a seven pound batch of caramel corn) three pounds of brown sugar, ⅝ pound of glucose, ½ pound of butter, one cup of skimmed milk, all appropriately mixed, and when heated to the desired temperature enough popped corn for uniformly coating same.

The kettle 20 is preferably formed from copper, and is provided with an annular seating flange 36 in circumambient relation about its receptacle portion 38 that is defined by bottom portion 30. Kettle 20 may also be provided with one or more appropriate handles 40.

The heater pot 18 comprises a bowl-like receptacle portion 42 provided with supporting legs 44 and a breather tube 46 positioned adjacent its upper rim portion 48, which rim portion 48 merges into an annular portion 50. The pot 18 may be provided with one or more handles 52 for convenience in handling.

The diaphragm 22 comprises a flexible sheet or film 53 of distendable material having good heat transfer characteristics, such as silicone rubber with a thickness in the range of from ten to fifteen thousandths of an inch. The diaphragm 22 is proportioned to rest on the flange portion 50 of pot 18, and in the form shown, it is provided with suitable holes 54 adapted to register with holes 56 and holes 58 of the pot flange portion 50 and the clamping ring 24, respectively for the purpose of receiving suitable flatheaded bolts 60 for the purpose of clamping the periphery of the diaphragm 22 to the flange portion 50 of pot 18.

It will be noted from FIGURE 2, that the diaphragm 22 when applied to the pot 18 defines with the inner surface 62 of the pot 18 an internal chamber 64. While the sheet or film 53 may be supplied essentially flat, as shown in FIGURE 1, it preferably is molded to define an indentation substantially conforming to the external configuration of kettle bottom portion 32, with the indentation being proportioned to be distended somewhat when the kettle 20 rests on pot 18 in the position of FIGURE 2; in this form, the rim portion of diaphragm 22 may take the form of a molded raised annular ring adapted for cooperation with a suitable complementarily formed annular clamping device for securing the diaphragm in place. Diaphragm 22 is .013 inch in thickness in a tested embodiment.

In use, the parts illustrated in FIGURE 1 are supplied in the kit 10, which may be packaged in any suitable and conventional manner for appropriate merchandising purpurposes. When one wants to use the kit 10, the heater pot 18 is assembled in the manner indicated, with an appropriate quantity of a liquid heat transfer medium being applied to the chamber 64, either before the diaphragm 22 is secured in place, or through the breathing tube 46. The liquid transfer medium may be a suitable vegetable oil or a hydrogenated vegetable oil (the latter is preferred), and the level of the oil should be somewhat below the level of the breather tube 46 to allow for expansion of both the liquid and the trapped air on heating.

In accordance with this invention, the caramel lump 14 is heated by being applied to the kettle 20 with the lump surface 32 in contact with kettle surface 34, and with the kettle 20 resting on pot 18 and having its bottom 30 proportioned to deflect or dispose the diaphragm 22 into contact with the liquid heat transfer medium indicated at 70. Preferably, the proportioning and shaping of the parts are such that when the kettle 20 is applied to the pot 18 in the manner indicated in FIGURE 2, the diaphragm 22 is deflected well into the body of liquid heat transfer medium 72 to form a rounded recess therein that has a depth in excess of the depth of the caramel lump 14. This distending action on the diaphragm 22 brings it into good heat conducting engagement with the kettle 20, which engagement is improved if the diaphragm has the molded shape previously indicated, as this eliminates the possibility that folds or wrinkles will form in diaphragm 22.

Heat is applied to the bottom of the pot 18 in any suitable manner, as by gas or suitable electric heaters, to heat the heat transfer medium 70, through which the heat passes to the kettle 20 and thence to the caramel lump 14. The mutually engaging surfaces of the caramel lump 14 and the kettle 20, plus the uniform application of heat to those surfaces by reason of the arrangement shown in FIGURE 2, results in the rapid uniform heating of the caramel lump, which then melts to liquid form.

The caramel material should be heated to a temperature in the range of from about 280 to about 290 degrees F. for coating purposes, after which the popped corn is stirred into the caramel material, as by employing the paddle 26. The popped corn may have been previously popped from that supplied in the container 12.

The round configuration of the kettle internal surface 34 is conducive to a ready coating of the popped corn without risking any burning of the caramel material. This is because the round surface configuration illustrated eliminates the presence of any pocket defining corners in which the caramel material might become lodged in quiscent pools that would be susceptible to burning. Furthermore, the stirring action on the popped corn and caramel mixture is much more effective due to the smooth rounded surface provided by the bottom portion of the pot 20.

After the coating process has been completed, the corn may be removed from the kettle 20 in any appropriate manner, as by removing the kettle 20 from the pot 18 and pouring the freshly coated popcorn into a suitable container.

FIGURE 6 illustrates a temperature sensing device that may be made a part of kit 10 to aid the user in determining when the preferred temperature range for coating the popcorn has been reached.

The temperature sensing device 80 of FIGURE 6 generally comprises a foil container 82 of any appropriate configuration and provided with a bottom portion 84 which has applied thereto as at 86 a coating of a heat sensitive substance 88, which preferably is of the type that changes appearance when the desired temperature range has been reached. One substance suitable for this purpose is applied as a lacquer consisting of a liquid dispension of a synthetic organic compound of a type that changes appearance at the temperature range indicated (280–290 degree F.). These compounds are well known in the art and are known as sharp melting compounds; one appropriate type has a dull matted appearance at lower temperature that changes to a transparent surface as the temperature passes the critical point (others change color).

In using the device 80, after the caramel lump 14 has been applied to the kettle 20 and the process has been started, the container 82 is placed on top of the caramel material. As the heating process proceeds, the caramel material melts and turns to liquid form, and its temperature rises toward the desired coating range. When the coating temperature range has been reached, the substance 88 changes appearance to give a visual indication of when the coating process should be started, after which the container 82 is removed and the popcorn applied to the kettle 20 in the manner already indicated.

FIGURES 3, 4 and 5 illustrate a modified form of heater device 16A that is especially adapted for commercial installations, as for instance, in food establishments at parks and beaches where it is desired to supply fresh caramel corn in large quantities for retail sales purposes.

The heater device 16A comprises essentially the same components as that described in connection with the device 16, and thus includes heater pot 18A, kettle 20A, distendable diaphragm 22A, and clamping ring 24A.

As shown in FIGURES 4 and 5, the diaphragm 22A is secured in place between flange 50A of pot 18A and the clamping ring 24A by appropriate bolts 60A.

In the form illustrated, the heater pot 18A is supported on appropriate legs 90 and is surrounded by suitable insulation 92 enclosed within a metal shroud or housing 94 that is held in place by being provided with an annular flange 96 (see FIGURE 4) formed with suitable holes for receiving the bolts 60A.

As in the case of the heater device 16, the pot 18A and the diaphragm 22A define a chamber 64A in which is applied an appropriate quantity of heat transfer medium 70, which should rise to approximately the level indicated at 98 when the kettle 20A is applied to the pot 18A.

The kettle 20A has affixed thereto an annular flange 100 which seats against the top surface of the clamping ring 24A to rest the kettle 20A on the pot 18A.

Kettle 20A may be comparable to the standard 50 pound capacity round bottom candy kettle which most candy manufacturers now have on hand.

Mounted in any suitable manner within the chamber 64A is an appropriate electrical resistance heating coil 102 provided with leads 104 and 106 that are appropriately connected with operating switches and a source of electrical energy. The pot 18A is provided with breather tube 46A, which may also serve as a fill spout for applying the heat transfer medium to chamber 64A.

The pot 18A may also include a suitable thermostat 110 that is connected into the electrical circuit for supplying electrical energy to the resistance coil 102 to avoid overheating of the medium 70.

The use of the heater device 16A in making caramel corn is substantially the same as that described above.

The caramel material shown at 112 in FIGURE 4 should be supplied in the form of a solid lump having an undersurface 32A that complements the configuration of the rounded lower surface 114 of kettle 20A, and when the kettle 20A is applied to the pot 16A for heating the caramel material, the diaphragm 22A deflects and distends to the position shown in FIGURE 4 to form the indicated rounded recess in the body of heat transfer medium 70 and place a substantial portion of the diaphragm 22A in contact with the medium 70.

The heating coil 102 is then energized to supply heat to the heating medium, which passes through the diaphragm 22A and thence to the kettle 20 and the caramel material, which then melts and raises the temperature to the above indicated popcorn coating level. The device shown in FIGURE 6 may be employed to indicate when the mixing temperature is right.

After the mixing temperature has been reached, freshly popped corn is poured into the kettle 20A and stirred into the caramel material by using an appropriate stirring paddle similar to the paddle 26.

After the coating process has been completed, the coated popcorn is removed from the kettle 20A in any appropriate manner.

It will thus be seen that the configuration of the bottom of the kettle 20A provides the same temperature control and mixing advantages described in connection with the form shown in FIGURES 1 and 2.

It will also be noted that in both the heating device forms shown in the drawings, the heating medium has perfect contact with the diaphragm 22 and 22A for good heat transfer characteristics and uniform heating results. However, in both instances, the kettle 20A may be removed from the heating pot without being concerned about heating medium dripping from the bottom of the kettle. Thus, the kettle heating arrangement of this invention provides for the perfect heat transfer contact that is associated with using a liquid heating medium, but avoids the drippage problem when the kettle is removed.

This heating characteristic of my heater arrangement together with the concept of heating a round bottom premixed caramel lump in a round bottom kettle insures that the caramel will be uniformly heated to the preferred coating temperature without danger of overheating, and that the corn can be readily stirred into the caramel material to complete the coating process without occasioning any burning of the caramel material.

The foregoing description and the drawings are given merely to explain and illustrate my invention and the manner in which it may be performed, and the invention is not to be limited thereto except insofar as the appended claims are so limited since those skilled in the art who have any disclosure before them will be able to make modifications and variations therein without departing from the scope of the invention.

I claim:
1. A heating device comprising:
a heater pot defining a recess adapted to contain a liquid heat transfer medium,
a flexible, elastic, substantially impermeable, diaphragm secured over said recess,
and round bottom kettle means for seating in said recess and deflecting said diaphragm into heat transfer relation with said medium,
said diaphragm being distended to conform to the configuration of at least the kettle round bottom and being in intimate heat transfer relation therewith.
2. A device for heating caramel comprising:
a heater pot,
a flexible elastic, substantially impermeable, diaphragm mounted across the upper portion of said pot,
a liquid heat transfer medium interposed between said diaphragm and said pot,
a round bottomed kettle resting in said pot on said diaphragm and deflecting said diaphragm into contact with said medium,
said diaphragm being distended to conform to the configuration of at least the kettle round bottom and being in intimate heat transfer relation therewith,
and means for heating said medium.
3. A heating device for liquidifying caramel comprising:
a heater pot containing a liquid heat transfer medium,
a distendable elastic thermally conductive substantially impermeable diaphragm mounted across the upper portion of the pot,
a round bottomed kettle resting in said pot on said diaphragm and distending said diaphragm into substantial liquid displacing relation with said medium,
said diaphragm being distended to conform to the configuration of at least the kettle round bottom and being in intimate heat transfer relation therewith,
means for heating said medium,
and a breather tube carried by said pot adjacent the upper portion thereof for accommodating expansion of said medium when heated.
4. A kit for making caramel corn comprising:
a round bottom kettle,
a lump of caramel in the solid state having a bottom portion that substantially complements the configuration of bottom portion of the inside surface of said kettle,
a heating pot proportioned to receive said kettle, a distendable diaphragm proportioned to close off the upper portion of said pot,
and means for securing said diaphragm to and across the upper portion of said pot.
5. A device for indicating the temperature of a liquid at the surface thereof comprising:
a foil container having an open top and adapted to float on the liquid surface,
and a layer of color changing heat sensitive material applied to the upwardly facing surface of said container bottom,
said material including heat sensitive means that changes color at a predetermined temperature for visually indicating the temperature of the liquid.
6. A caramel corn making arrangement comprising:
a round bottom kettle,
a lump of caramel in solid form having a bottom surface complementing the inside surface of the lower portion of said kettle,
means for heating said kettle to melt said caramel into liqiud form,
and heat sensitive means for visually indicating when the melted caramel has been heated to a predetermined temperature range,
said heat sensitive means comprising:
a foil container floating on the caramel,
and a quantity of color changing heat senisitive material applied to the upwardly facing surface of said container bottom.
7. A caramel corn making arrangement comprising:
a round bottom kettle,
a lump of caramel in solid form having a bottom surface complementing the inside surface of the lower portion of said kettle,
means for heating said kettle to melt said caramel into liquid form,
said heating means comprising:
a heater pot containing a liquid heat transfer medium,
a distendable diaphragm mounted across the upper portion of the pot,
said kettle resting in said pot on said diaphragm and distending said diaphragm into substantial liquid displacing relation with said medium,
electrical resistance heating means immersed in said medium for heating said medium,
and thermostat means operatively asssociated with said resistance heating means and in thermal contact relation with said medium for controlling the temperature of said medium.
8. The method of making caramel corn which includes:
taking a round bottom pot and immersing the bottom portion thereof in heat transfer relation with a liquid heat transfer medium while maintaining said bottom portion physically separated from said medium,
taking a lump of caramel in the solid state and formed to define a bottom portion substantially complement- ing the configuration of the pot bottom and putting the lump in the kettle with the lump bottom in engagement with the pot bottom, heating the heat transfer medium to uniformly heat the pot bottom portion to melt the lump and raise the temperature of same to a temperature in the range of from about 280 to about 290 degrees F., pouring into the melted caramel a selected quantity of popped corn, stirring the popped corn into the caramel, and removing the caramel coated corn.

References Cited by the Examiner

UNITED STATES PATENTS

| | | | |
|---|---|---|---|
| 963,892 | 7/1910 | Haskins | 219—540 |
| 2,006,059 | 6/1935 | Rudorff | 219—439 |
| 2,027,167 | 1/1936 | Harris | 99—134 |
| 2,122,016 | 6/1938 | Stokes | 99—134 |
| 2,451,096 | 10/1948 | Kooman | 107—54 |
| 3,083,286 | 3/1963 | Swetlitz | 219—462 X |
| 3,094,947 | 6/1963 | Green et al. | 107—54 |
| 3,095,326 | 6/1963 | Green et al. | 118—20 X |
| 3,157,774 | 11/1964 | Moore et al. | 219—439 X |
| 3,167,453 | 1/1965 | Cretors | 107—54.7 X |

FOREIGN PATENTS 562,888   9/1958   Canada.

WALTER A. SCHEEL, *Primary Examiner.*

R. N. JONES, *Examiner.*

J. SHEA, *Assistant Examiner.*